(12) United States Patent
Power (10) Patent No.: US 8,708,640 B2
(45) Date of Patent: Apr. 29, 2014

(54) METHOD AND APPARATUS FOR EFFICIENTLY GENERATING AND EXTRACTING POWER FROM AN AIR FLOW TO DO USEFUL WORK

(76) Inventor: Bernard A. Power, Dorval (CA)

( * ) Notice: Subject to any disclaimer, the term of this patent is extended or adjusted under 35 U.S.C. 154(b) by 681 days.

(21) Appl. No.: 12/927,830

(22) Filed: Nov. 26, 2010

(65) Prior Publication Data

US 2011/0176908 A1 Jul. 21, 2011

Related U.S. Application Data

(60) Provisional application No. 61/336,181, filed on Jan. 19, 2010.

(51) Int. Cl.
*F01D 25/24* (2006.01)

(52) U.S. Cl.
USPC .................................................. 415/1; 415/80

(58) Field of Classification Search
USPC ............. 415/1, 80, 916; 416/193 R, 20 R, 22
See application file for complete search history.

(56) References Cited

U.S. PATENT DOCUMENTS

| | | | | |
|---|---|---|---|---|
| 3,744,766 | A * | 7/1973 | Bannister | 366/343 |
| 4,519,744 | A * | 5/1985 | Arold | 415/92 |
| 7,708,522 | B2 * | 5/2010 | Schlote | 416/1 |
| 2011/0164958 | A1* | 7/2011 | Saitoh | 415/1 |

OTHER PUBLICATIONS

*Standard Handbook for Mechanical Engineers.* T. Baumeister, Ed. Seventh edition. McGraw-Hill Book Company, New York,1958.
Shapiro, A. H., *The Dynamics and Thermodynamics of Compressible Fluid Flow*. 2 vols. Wiley and Sons, New York, 1953.
Munson, Bruce, R., Donald F. Young, and Theodore H. Okiishi, *Fundamentals of Fluid Mechanics*. Wiley and Sons, New York, 1990.
Power, Bernard A., *Tornado- genesis by an Isentropic Energy Transformation*. Posted Jun. 21, 2008 on Website www.energycompressibility.info.
"*Perpetual Motion*". Encyl. Britannica., vol. 17, p. 528, 1959.
*Machinery's Handbook.* 27th Edition.. Industrial Press Inc,. New York, 2004.
Lindsay, Robert Bruce and Henry Margenau, "*Foundations of Physics*". Dover Publications, Inc., New York, 1957.].
*Standard Handbook for Mechanical Engineers.* T. Baumeister, Ed. Seventh edition. McGraw-Hill Book Company, New York, 1958.
"*Perpetual Motion*". Encylopedia. Britannica., vol. 17, p. 528, 1959.
Lindsay, Robert Bruce and Henry Margenau, *Foundations*.
Standard Handbook for Mechanical Engineers p. 2 line 2 p. 2 line 6 Carnot heat engine efficiency, p. 3 line 1 Windmills in general, p. 14 line 19 Smooth flow, p. 19 line 5 2nd Law Thermodynamics.

(Continued)

*Primary Examiner* — Edward Look
*Assistant Examiner* — Liam McDowell (57) ABSTRACT

A portion of the internal energy of a mass flow of a compressible fluid, such as air, is transformed efficiently into greatly increased flow kinetic energy by passing the flow through a set of converging nozzles in a cylindrical rotor; this accelerates the isentropic flow to sonic speed generating large thrust. The nozzle thrust generates torque, thus rotating the rotor which is coupled to a power take-off for doing useful work. The mass flow of air through the apparatus is supplied by a vacuum pump.

4 Claims, 2 Drawing Sheets

(56) References Cited

OTHER PUBLICATIONS

The Dynamics and Thermodynamics of Compressible Fluid Flow p. 2 line 6 Carnot efficiency, p. 10 line 5 Isentropic flow, p. 14 line 10 Smooth flow, p. 19 line 5 2nd Law Thermodynamics.
Fundamentals of Fluid Mechanics p. 9 line 14 p. 10 line 5 Acceleration.
Tornado-genesis by an Isentropic Energy Transformation p. 3 line 17 (0006) Isentropic, acceleration.
Encyclopedia Britannica p. 3 line 14 Discouragement as to perpetual motion research, p. 23 line 17 $2^{nd}$ Law.
Machinery's Handbook p. 27 line 16 Rotor bursting Formula.
Foundations of Physics p. 28 line 11 ff Newton's Action and Reaction Law, p. 23 line 17 $2^{nd}$ Law.

* cited by examiner

METHOD AND APPARATUS FOR EFFICIENTLY GENERATING AND EXTRACTING POWER FROM AN AIR FLOW TO DO USEFUL WORK

CROSS-REFERENCES TO RELATED APPLICATIONS

1. The general disclosure of this invention was first filed in Canada as: "A Method for Efficiently Generating and Extracting Power from an Air Flow for Useful Work". Canadian Patent Application 2,688,872, Filed Dec. 7, 2009. Applicant and Sole Inventor: Bernard A. Power.

2. On Jan. 19, 2010 a Provisional Patent Application entitled: "Method for efficiently generating and extracting power from a swirling air flow for useful work" was filed in the U.S. Application No. 61/336,181 filed Jan. 19, 2010. Applicant and Sole Inventor: Bernard A. Power. This Provisional Application was essentially the same as the Canadian Application 2,688,872. The present U.S. Patent Application and disclosure follows and amplifies this Provisional Application disclosure.

BACKGROUND TO THE INVENTION

Using compressible fluids, especially expanding hot gas or steam, to produce useful work is generally a procedure of heating the gas and then extracting energy of the resulting pressure-volume energy change of expansion to produce external work, with this process involving a flow of heat into and out of the system and thereby being irreversible, and having a relatively low efficiency as described by the Carnot Cycle in the theory of heat exchange in a non-isentropic thermodynamic process [Ref. 1]. The Carnot efficiency is given by the formula $$\text{Eff.}=1-T/T_o=\Delta T/T_o$$

where T is the gas temperature at the end of the cycle and $T_o$ is the reference temperature before heat input at the beginning of the Carnot work cycle [1,2]. The source of the heating in a heat engine is usually fossil fuel, so that undesirable or noxious gases are generated and exhausted to the atmosphere.

Devices for transforming internal energy of the air into work by creating kinetic energy of linear air flow, rather than energy of volume expansion or contraction, are less useful and less numerous, for example, vacuum pumps, vacuum cleaners, air blowers and so on. These flow devices are typically inefficient; a typical vacuum cleaner, for example, may be less than 40% efficient.

No previously known device has been self-sustaining, that is to say, has its power output exceeding the power input needed to sustain the basic air flow through the device. It will be seen that the present invention, however, if practiced at close to 100% flow efficiency does accomplish this by an excess of output power over input power. While the present power excess is not large, the new principle established in this invention can lead to large stand-alone power sources or prime movers. Since the present isentropic flow invention is not a heat engine, it does not involve the prohibition against self-sustaining motion by the second law of thermodynamics.

Windmills are another example of air motors [1] in which an essentially linear air flow from wind is used to drive a freely rotating propeller which in turn is attached to a shaft driving an electric generator or motor. The so-called Betz Limit then sets 59.3% as the maximum percentage of wind kinetic energy that can be extracted from the moving air stream by any propeller or turbine. Other losses such as friction, power take-off transfer losses, etc, are in addition to this Betz Limit loss. However, considering that the total internal energy of a mass of air at sea-level conditions (20 degrees C. and 101.3 kilopascals pressure) is very large, the search for a means for a) generating a larger flow velocity and b) then efficiently extracting this new kinetic energy from the flow to do work, was seen by the present inventor as a worthwhile endeavor.

A deterrent to this search lies in the fact that, while the enormous potential energy of this internal heat reservoir of any gas at ordinary temperatures has long been well known, the prudent warnings that any 'perpetual motion' even of the "second kind' from tapping into internal heat energy is still impossible [5] has inadvertently discouraged the inclination to look in the direction of fluid flows for a solution to the world's urgent clean energy needs.

However, the present inventor personally observed on Sep. 2, 1987 [4] a very rare naturally occurring transformation of the internal energy of the atmosphere taking place and producing a small, localized, high speed whirlwind over a calm, cool lake. A lengthy investigation into the thermodynamics of these rare whirlwinds has led the inventor to the conclusion that the process involved is a highly efficient, localized, isentropic transformation of internal energy into rotational kinetic energy rather than an inefficient expansion Carnot cycle or heat engine phenomenon, and, moreover, that this efficient process may be involved in the formative stages of most other whirlwinds such as tornadoes and waterspouts which are much more common.

The inventor was then led to undertake a lengthy investigation into linear isentropic air transformations and to the present invention, which involves the use of such an efficient energy transformation to convert internal energy into kinetic linear flow power, coupled with a novel means for efficiently extracting the enhanced air power reactively as rotational energy and then exporting it for useful work.

BRIEF SUMMARY OF THE INVENTION (1). A method of efficiently generating and extracting power from a flow of air for useful work comprising:

a) inducing a chosen mass flow of air or other compressible fluid, preferably ambient atmospheric air by a vacuum pump source, (b) conducting said chosen mass flow of air into and through a set of two or more conical internally converging nozzles formed within a cylindrical rotor disc, said rotor rotating freely on a central shaft or axle, said rotor having its rotation axis aligned at right angles to the longitudinal axes of said conical nozzles; said chosen mass flow of air thus becoming partitioned into a set of equal portions of said mass flow of air among said set of conical converging nozzles;

(c) arranging said conical nozzles circumferentially and symmetrically in said rotor, with their flow entrance ports situated on the outside rim of said rotor, said nozzles leading through said rotor into an inner central circular air chamber of designed radius inside said rotor, each of said nozzles having its longitudinal axis aligned at right angles to the rotation axis of said rotor, each of said nozzles being also aligned so as to be essentially tangent at its exit port to said inner air chamber at said designed radius so that the air flow through each said converging nozzle exits tangentially into said inner chamber at said designed radius from said inner air chamber's longitudinal axis;

(d) constructing each said converging nozzle to have a minimum throat cross-sectional area so as to pass through each said throat an equal portion of the total said chosen mass flow of air at near sonic speed; said chosen mass air flow thus undergoing a quasi-isentropic acceleration to near sonic speed through said converging nozzles, and with the total of all of the partial flow of air through all said nozzles taken together being equal to the total of said chosen mass flow of air;

(e) accelerating said chosen mass flow of air through said converging nozzles and thus exerting a reverse thrust on said rotor as said sonic flow passes out from said nozzles and into the said inner air chamber, said thrust direction being offset from the centre of rotation at said designed radius from the central rotation axis of said rotor and thus also exerting a torque on said rotor; said torque causing said rotor to rotate in the opposite direction to the direction of the nozzle exit flow into said inner air chamber, said rotor thereby acquiring by reaction force a rotational energy from the thrust force of the nozzles' accelerated air flow;

(f) said inner air chamber having a downstream exit port of cross-sectional area equal to the combined throat area of the said nozzles taken together, said mass air flow then exiting from said inner chamber through said downstream exit port into a flow diffuser or diverging duct; said flow diffuser decelerating said air flow and leading it towards a flow exit port and back into the ambient atmosphere.

(2) An air motor apparatus, consisting of a substantially cylindrical rotor, said rotor being mounted on a central shaft or axis, said rotor having two or more converging nozzles molded, cast, machined or otherwise formed into said rotor and situated symmetrically in said rotor so as to conduct a chosen mass air flow drawn in by a vacuum pump source through said converging nozzles from said nozzles entrance openings on the said rotor's circumference or rim, said nozzles having their smaller inner exit opening in an inner circular air chamber within said rotor, said nozzle exit openings in said inner circular air chamber being situated at a designed radial distance from the axial centre of said inner air chamber, said accelerated chosen mass flow of air thereby exerting a thrust when said air flow leaves said nozzle's exit ports and enters said rotor's inner air chamber; said thrust then in turn exerting a torque on said rotor so as to rotate said rotor in the opposite sense to the direction of the exiting flow thrust, said flow then passing through said inner air chamber and exiting through a chamber exit port of approximately the same area as the sum total area of the nozzles exit port areas; said inner chamber's exit port leading said air flow into a flow diffuser connected to a vacuum pump that provides and sustains said chosen mass air flow through said air motor; said rotor thereby acquiring power from the reaction force accompanying said accelerating air flow produced by said converging air flow nozzles; said rotor power at its maximum being one half of the air power of the flow when accelerated through the nozzles to sonic speed; said power in said rotating rotor being then exportable to the exterior as shaft power by coupling to any rotary power transfer means such as belt, gear, hydraulic, magnetic or other means.

DETAILED DESCRIPTION OF THE INVENTION IN A PREFERRED EMBODIMENT

In the present inventor's Provisional Patent Application ["Method for efficiently generating and extracting power from a swirling air flow for useful work" U.S. Application No. 61/336,181, Confirmation NO. 4453, Applicant and Inventor: Bernard A. Power. Jan. 19, 2010] the disclosure was made of "method . . . which consists of setting up a swirling and accelerating air flow through an axially mounted flow swirler which is itself freely able to rotate on its cylindrical axis."

However, there were two competing coordinate points of view expressed there; first, relative to laboratory coordinates the air in the turning rotor is indeed "swirling", but, second, relative to the rotor itself the flow is linear. Since it is the flow relative to the rotor that determines the physics of the air flow, it seems more direct and less ambiguous to simply describe the invention in its physical coordinates, that is to say in terms of linear flow and linear accelerations only. Both approaches are legitimate, but the single coordinate system seems clearer and unambiguous, and will be followed in the present disclosure and application. While there is "swirling" in the rotor and in the air chamber relative to the fixed or laboratory/workshop coordinates, it is irrelevant to the physics of the air flow behavior and so to the physical description of the invention and will not be mentioned further. There is one exception to this, namely that the rotor power depends on the net velocity of the gas relative to the rotor, and so to calculate this net velocity we need not only the exit flow velocity relative to the rotor but the absolute rotational velocity of the rotor itself, that is to say, with respect to the fixed coordinates of the laboratory/workshop or test bed. This will be made clear in the description of the rotor power of the invention in paragraph 0038(5).

A lengthy and diligent investigation of this complicated problem has produced the present disclosed invention.

An essential feature of the invention is the very efficient addition of kinetic flow energy to a low energy (low speed) flow of air by means of an isentropic acceleration of that air flow from low speed up to near sonic speed. This flow transformation is now described.

(a) Isentropic Flow Transformations

As a demonstration of the essential principles involved, we first describe isentropic energy transformations using the case of the converging/diverging linear flow nozzle called the De Laval nozzle. In an isentropic process, the entropy (usually denoted as S) remains constant (dS=0) hence the term isentropic, and no heat flows into or out of the system. We note that, while the isentropic acceleration of air to transform the internal heat energy of the air to kinetic or dynamic pressure energy is relatively easy and efficient, the efficient reverse process of deceleration of the exhaust air to its original state is difficult [3] and can entail large flow velocity losses which will cause an increase in exit flow pressure above the original value, a decrease in overall flow pressure gradient from flow entrance to flow exit, and therefore a decrease in the mass flow being pulled through the system (by a vacuum source for example) and thus a large reduction in the power output.

(b) Nozzle Flow Isentropic Acceleration

Acceleration of a gas flow to produce increased linear kinetic energy is relatively easy to accomplish efficiently by constraining the flow to pass through a duct of decreasing cross sectional area. The restraining mass continuity equation is $$\rho_1 V_1 A_1 = \rho_2 V_2 A_2 = dm/dt = \text{m-dot} = \text{constant} \tag{1}$$

where the subscript numerals refer to values of the density $\rho$, velocity V and cross-sectional area A at different cross sections (i.e. at points 1, 2 3, etc.) along the flow path. The thermodynamic process which takes place increases the flow velocity and at the same time causes the pressure, density and pressure drop; the process is called isentropic, because there is no change in the entropy of the fluid.

This isentropic flow transformation, and its air speed enhancement in a converging/diverging nozzle is now described. In an isentropic flow [2,3] the changes in the thermodynamic variables of the gas, i.e. in the pressure p, density $\rho$, temperature T, speed of sound c, and flow velocity V, all take place, with no inflow or outflow of heat, according to the isentropic relationships:

$$(p/p_o)^{(k-1)/k} = (\rho/\rho_o)^{k-1} = T/T_o = (c/c_o)^2 = 1 - 1/n(V/c_o)^2 \tag{2}$$

here $n = 2/(k-1)$ and $k = c_p/c_v$ the ratio of specific heats, while the subscripts $(\,)_o$ refer to stagnation values of the thermodynamic variables. Expressed in terms of the number of ways n that the energy is divided ($n = 2/(k-1)$), we also have $$(p/p_o)^{2/n+2} = \rho/\rho_o)^{2/n} = T/To = (c/c_o)^2 = 1 - 1/n(V/c_o)^2 \tag{2a}$$

Thus, for example, a drop in any one of pressure, density or temperature brings about a drop in the other two but an increase in the flow velocity, all without any heat flow work being done. The subscripted values are for stagnation or zero velocity initial conditions. For air, the value of k, the ratio of specific heats ($k = c_p/c_v$) has the value 1.4. Here c is the local speed of sound and $c_0$ is its stagnation value (about 343 m/s at m.s.l. and 20° C.).

The general subject of air flow is a part of fluid mechanics [3], which deals with both incompressible and compressible flows. Air is compressible, so that its density is not constant but varies with the flow speed V, the pressure p and the temperature T. The changes in air density with flow speed are quite small up to speeds of about Mach 0.3 (about 90 m/s), so that for low wind speeds air is often treated as being incompressible with the density $\rho$ being taken as constant (about 1.2 kg per cubic meter at m.s.l.). The two principal flow equations for the incompressible case are the Bernoulli equation and the equation of mass continuity which are as follows: First, the Bernoulli equation, stated in energy units, is $$\int dp/\rho + \tfrac{1}{2} V^2 = \text{constant along a streamline} \tag{3}$$

For incompressible flow, this becomes $$p/\rho + \tfrac{1}{2} V^2 = \text{constant along a streamline} \tag{3a}$$

Stated in terms of pressure units, the Bernoulli equation becomes $$p + \tfrac{1}{2} \rho V^2 = \text{constant along a stream line} = p_o \tag{3b}$$

Here p is the static pressure, while the second term $\tfrac{1}{2} \rho V^2$ is called the 'dynamic pressure'. Clearly, the two pressures are interchangeable, and transformations of static pressure into dynamic or flow pressure are readily calculable with this important and fundamental equation, For example, a flow system with static pressure of 101 kPa pressure could accelerate and become a system of 51 kPa of static pressure plus 50 kPa of dynamic or flow pressure, and vice versa; $p_o$ is the total or combined pressure called the stagnation pressure.

The second flow equation is the Equation of Continuity of Mass $$\rho_1 V_1 A_1 = \rho_2 V_2 A_2 = dm/dt = \text{m-dot} = \text{constant} \tag{4}$$

where the subscript numerals refer to values of the density $\rho$, velocity V and cross-sectional area A at different cross sectional points along the flow path.

It is seen that Equation (4) represents the mass m of air flowing per second (dm/dt), which in SI units would be expressed as kilograms of air passing through any given area per second. Thus, a reduced cross-sectional area A, means an increased velocity V and vice versa. The velocity change in passing through a conical nozzle can be formulated as $$V_2 = V_1 [A_1/A_2][\rho_1/\rho_2] \tag{5}$$

From this we can see that, if the air density $\rho$ were to be constant, the velocity increase in a converging nozzle would be inversely proportional to the cross-sectional area decrease. This simplifying constant density assumption could apply for example to air speeds of about Mach 0.3 (90 m/s). Above that speed, the decrease in density with increasing velocity becomes important for compressible fluids and this must be explicitly be taken into account through the use of the isentropic relationships (Eqns. 2 and 2a.).

As mentioned, isentropic velocity increases readily take place, for example, in a converging nozzle through which the flow is directed; the velocity reaches its maximum value at the narrowest cross-section of the nozzle called the 'throat'. If the exiting flow is then passed on through a properly designed diverging nozzle or 'diffuser', it will decelerate and drop back to the desired velocity, pressure and density values at the exit. In deceleration flow, for example in a diverging conical nozzle or 'diffuser', there are usually large losses in flow velocity which can, however, be avoided by the exercise of design and manufacturing care.

A given mass flow, for example 1 kg of air per second, passing through a converging nozzle, will have its flow velocity V increased as required by the equation of mass continuity Eqn. 4 to keep the value of the mass flow constant, while at the same time the cross-sectional area of the duct at that section must be made small enough to balance the velocity increase.

With a suitably dimensioned nozzle the initial intake air speed can continue to increase through the converging nozzle until it reaches the sonic speed V* (about 313 m/s at sea level) at the minimum cross-sectional area of the nozzle or 'throat', at which limiting velocity the flow physically "chokes" or stops increasing in velocity. At this sonic flow speed of about 313 m/s the pressure will have dropped by 47.2%, the density by 37% and the temperature by 17%, while the air flow power will have increased as the cube of the flow speed increase.

To determine the minimum or throat area A* of the converging nozzle needed to pass any selected mass flow at sonic speed (313 m/s), we proceed as follows: First, determine the mass flow m-dot (for example, 0.074 kilograms per second which is the rated mass flow of one commercial vacuum source)) which can be provided and sustained by the flow source available. Then, from the continuity equation, we have at the nozzle throat, a flow given by $\rho^* V^* A^* = 0.074$ kg/s Next, solve for the value of A* with the sea level density $\rho_o = 1.2$ kg/m$^3$ and $\rho^* = \rho_o \times 0.63394) = 1.2 \times 0.63394$ and velocity (313 m/s) at the sonic condition to get $A^* = 0.074/(1.2 \times 0.63394 \times 313) = 3.11 \times 10^{-4}$ sq. m., and a corresponding design throat diameter D* of 0.0198 meters or 0.78 inches.

To sum up, in a flow acceleration through a converging nozzle, the governing relationships are the isentropic equations which describe the additional kinetic energy production plus the equation of mass continuity which describes the flow restraint of cross-sectional area change.

(c) Isentropic Flow Deceleration in Diverging Area Ducts or Diffusers

While isentropic flow acceleration with almost no pressure losses is relatively easy, the efficient deceleration of a flow, without encountering large non-isentropic losses, is attainable but quite difficult. Flow vortices and turbulence occur readily in a decelerating flow and these introduce non-isentropic pressure rise losses which reduce the mass flow rate unless great care is taken to design the diffuser to ensure well-rounded entrances, exits and efficient duct shape [1, 2, 3]. With good design, diffuser nozzle efficiencies of 90 to 99% are possible.

(d) Work Available from a De Laval Nozzle Flow

To see what work can be had from a De Laval nozzle, let us look at the pressure gradient through the nozzle system. For example, a vacuum source of, say, −1.3 kilopascals pressure deficit produces a mass air flow of say 0.056 kilograms per second. Then the design exit velocity will be 46.6 m/s. Inside the nozzle at the throat the flow will be sonic (313 m/s), but that greatly enhanced flow kinetic energy at the nozzle throat is unavailable for work, since it is only the final nozzle exit velocity that determines the thrust or available work energy and in this example this is only 46.6 m/s instead of 313 m/s.

(e) A Preferred Embodiment of the Invention

We shall now describe how the present invention overcomes these difficulties in a unique and novel manner so as to make the high speed flow at the throat available to do useful work. The present invention is not a heat engine; rather it is an isentropic, reaction, air motor system.

Figure 1:
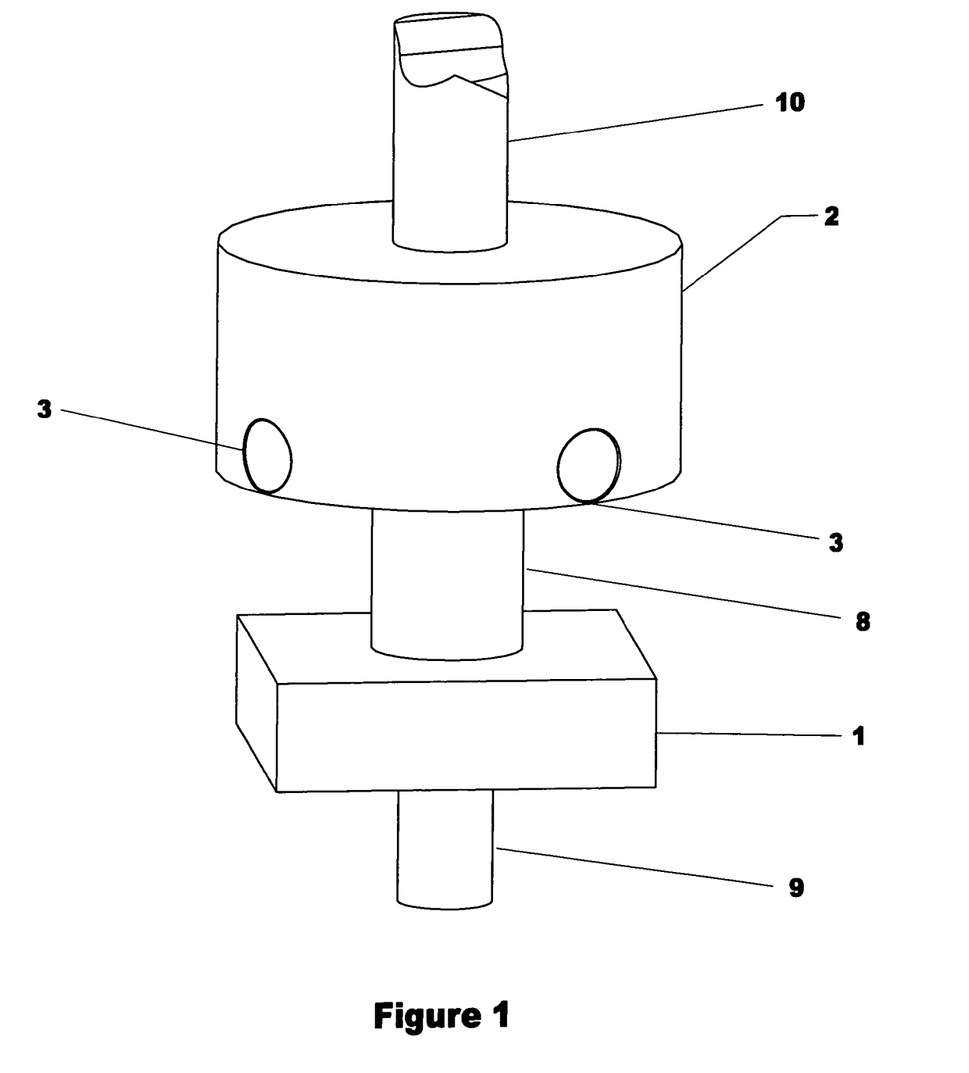
FIG. 1 shows an air flow source 1, such as a vacuum pump, drawing a mass flow of air in through a cylindrical rotor 2 via a set of air nozzles 3 which accelerate the mass flow through them to near sonic speed without any heat being added or extracted, that is to say the change is isentropic. The accelerated air flow exerts a thrust and torque on the rotor and causes it to rotate. The mass flow then is decelerated efficiently through a flow diffuser 8 to the vacuum pump source and exhausted to the atmosphere out through the pump exit. The acceleration of the air flow adds great air power to the flow; the resulting thrust and torque is transmitted reactively to the rotor for exaction via a power take-off means.
Figure 2:
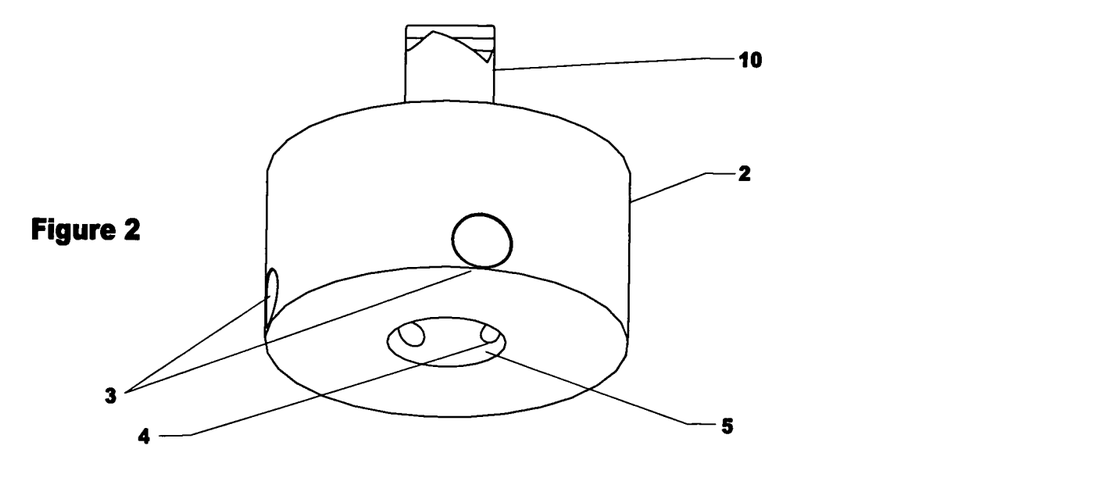
FIG. 2 shows details of an inner air chamber 5 into which the nozzles pass the accelerated air flow and in which the thrust and torque are produced.
Figure 3:
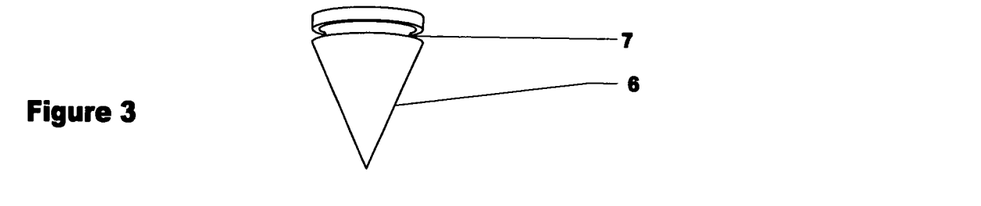
FIG. 3 shows the chamber exit plug 6 which forms one side of the said inner air chamber. The exit plug 6 and diffuser tube 8 (FIG. 4) efficiently slow down the accelerated air flow coming from the nozzles and inner air chamber with minimum loss and deliver it to the vacuum source 1 for exhaustion back to the ambient atmosphere.
Figure 4:
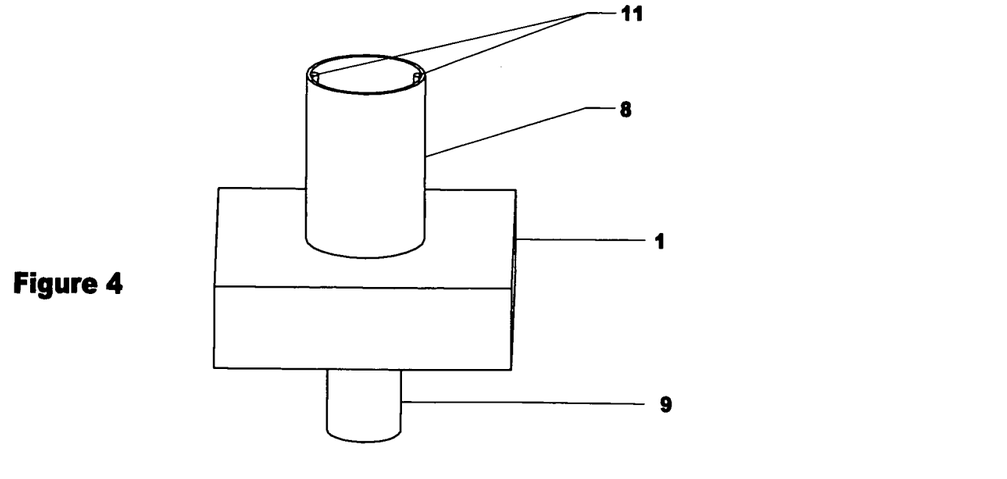

In one preferred embodiment of my invention, shown in FIGS. 1 to 4. I first produce (see FIG. 1) from a vacuum source 1 a flow of air having a fixed mass flow rate m-dot=ρVA. I then accelerate said mass flow by passing it through a set of two or more converging nozzles 3 in a substantially cylindrical rotor 2, said rotor being mounted on an axle or shaft 10, said nozzles being molded, cast, machined or otherwise formed into the material of which the said rotor is made and being situated circumferentially and symmetrically in said rotor so as to conduct an air flow in through said rotor entrance openings 3 on the said rotor's circumference or rim, said nozzles having their smaller inner exits 4 (see FIG. 2) opening into an inner annular air chamber 5 within said rotor; said nozzles 3 being positioned circumferentially and symmetrically so that their exit openings 4 into said inner circular air chamber 5 are situated at a designed radial distance from the axial centre of said inner air chamber 5, said converging nozzles 3 accelerating said air flow through them and said acceleration thereby exerting a thrust when said accelerated air flow leaves said nozzles' exit ports 4 and enters said inner rotor chamber 5 at the said designed radial distance from the centre of said inner air chamber; said thrust then in turn exerting a torque on said rotor so as to rotate said rotor in the opposite sense to the direction of the exiting flow thrust, said exiting or thrust flow then passing through said inner air chamber 5; said air chamber having an tapered exit plug 6 (see FIG. 3), said tapered exit plug being of such a diameter as to fit inside said inner air chamber 5 leaving a resulting annular clearance space between said exit plug 6 and said inner air chamber 5 through which the nozzle exit flow can exit at approximately the same total cross-sectional flow area as the sum total of the nozzle exit areas, so as to maintain the near sonic flow velocity that supplies the thrust; said tapered exit plug 6 moreover having a shaped groove 7 in its larger end (see FIG. 3) into which the nozzle thrust flow discharges before then exiting through the said annular clearance space; said exit plug 6 in turn fitting inside a flow diffuser tube 8 with the resulting clearance space between said exit plug 6 and said diffuser tube 8 (see FIG. 4) forming thereby a diverging flow duct for the air flow from the inner air chamber 5, said resulting annular flow duct initially having approximately the same cross sectional area as the sum total of the exit areas of the rotor nozzle exits combined so as not to slow down such air flow suddenly and inefficiently, said duct area formed annularly between said tapered exit plug and said diffuser tube then gradually increasing in area along said tapered plug 6 of diminishing cross sectional area inside said diffuser tube 8 so as to gradually and smoothly increase the effective annular flow duct's cross-sectional area thus allowing the said diverging air flow to slow down efficiently and match the design intake flow velocity of the vacuum pump 1; said diffuser being connected to the intake port of said vacuum pump 1, which sustains the said mass air flow through said air motor system and delivers the final exhaust flow to the apparatus air flow exit port 9, said tapered exit plug 6 being positioned so as to fit at its larger end centrally into said inner air chamber 5 and at its tapered portion to be centrally positioned inside said diffuser tube 8 by being securely attached to said diffuser tube 8 by two or more smoothly shaped mounting and centering pins 11 or similar mounting brackets.

My invention thus passes the flow through the nozzles, causing an isentropic acceleration of the flow in the nozzles up to sonic or near sonic speed at the nozzle throat or exit so as to generate the desired maximum thrust at the exit from the nozzles and exert a desired torque on the rotor causing it to rotate and take up the power being generated by the torque. The rotor turns in the direction opposite to that of the thrust flow as required by the law of conservation of momentum or Newton's Law of Action and Reaction.

Thus, the torque generated by the reaction force opposite to the flow thrust through the nozzles transfers power to the rotor without in any way impeding the mass flow itself, which simply passes out through the nozzle exits 4, into the air chamber exit channel 7, then into the diffuser 8 and on to the vacuum system flow exit 9. In this manner, rotational energy is transferred by the thrust/torque reaction force to the rotor 2 automatically, and so it becomes readily available as shaft turning power to be extracted economically and efficiently from the said rotor by any suitable coupling or rotary power transfer means (not diagrammed) to do useful work, for example by a belt or chain power takeoff, a cog or gear take off, a hydraulic take off or other suitable power take-of means.

The present invention is thus a novel isentropic method of efficiently accelerating a linear air flow through a converging nozzle or nozzles situated in or on a freely turning rotor, while simultaneously and efficiently transforming said flow's increased linear kinetic energy into flow thrust and torque and into rotational energy of the rotor which then becomes readily available to produce work. It is indeed startling in its economy, its simplicity and its improvement on any existing energy source or method for the generation and supply of clean, economical energy.

The "fuel" or energy source for the present invention is typically air, and so, for continuous operation of the method, a continuous flow of air is required. In the embodiment just described the source of the said mass flow of air is a vacuum pump. In another embodiment the air flow source is a compressor or compressed air supply reservoir. In yet another embodiment the air flow is the relative air flow moving past the air motor when it is mounted on a moving vehicular platform such as on an automobile, a truck, train, ship, airplane, rocket or the like. In another embodiment the air flow is supplied by the wind with suitable ducting to conduct the air to the cylindrical rotor of the invention. The source of the air flow may also be a convective up-current of warmer or less dense air, a hot gas rising through a chimney, or a natural convective up-current in the atmosphere, and so on.

It is pointed out that, while the present disclosure and application deals specifically with air, the invention disclosed applies equally to any compressible fluid.

In any actual device there will frequently be some inefficiency so that the flow may be actually quasi-isentropic, but the disclosed invention covers these situations as well as isentropic devices and means.

As to efficiency, for example, a certain vacuum device which produces a mass flow rate of 0.074 kg/s can only produce a maximum suction power of about 625 watts, but requires an input power of 1690 watts, so that the device is only about 37% efficient with respect to the transformation of internal air energy into linear flow energy. In the present invention, however, the same mass rate of air flow of 0.074 kg/s at 100% efficiency results in an air flow power output of 3625 watts and a rotor take-off useable power output of 1812 watts for the same power input of 1690 watts. The present invention thus appears to be uniquely "self sustaining" in that it apparently can, if desired, be configured, by feeding back sufficient generated rotary power to the vacuum pump, to provide a unique Perpetual Motion (Perpetuum Mobile) achievement. It is repeated, however, that it is not a heat engine system and so such self-sustaining operation does not involve violation of the second law of thermodynamics [1,2,3].

It is also pointed out that if there are substantial flow losses, that is if the efficiency is less than 100%, the method may not then be self sustaining, but it will still be very much more efficient than prior art flow devices. For example, at 76% efficiency a flow of 0.074 kg/s becomes 0.056 kg/s which will produce 2743 watts or air flow power and 1371 watts of useable take off rotor power. for the same input power of 1690 watts. While this would not be self sustaining, it will still be several hundred percent more efficient than existing prior art flow devices.

In the self sustaining mode of operation, once the base mass flow is initiated, the atmospheric air is the only 'fuel' or energy input needed, while the exhaust is the same air that entered the nozzles from the atmosphere substantially unaltered.

To illustrate the elements of the method as clearly as possible, we may consider the following design steps:

(1) The mass flow rate selected or available m-dot=ρVA, from the vacuum or pressure source, will determine a maximum design air power output, $P_{air}$ to be obtained at the sonic velocity flow limit, under the condition of no flow velocity losses, (that is, under 100% efficiency of flow), which is given by $$P_{air} = \tfrac{1}{2}m\text{-dot } V_{sonic}^2 = \tfrac{1}{2}m\text{-dot} \times (313)^2 \text{ watts}$$

For example, under this condition of 100% assumed flow efficiency (no flow velocity losses), a chosen flow of 0.74 kg/s, for example, will produce a maximum air power at the sonic limit of $P_{air} = \tfrac{1}{2} \times 0.074 \times (313)^2 = 3625$ watts.

(2) The design throat area A* of the nozzle, needed to accelerate a selected design mass flow rate m-dot to the sonic flow speed (313 m/s), is given by $$A^* = m\text{-dot}/\rho^* V^*.$$

(2a) For example, for a mass flow rate of m-dot=0.074 kg/s, and no flow losses, the nozzle throat area A* must be $0.074/1.2 \times 063394 \times 313 = 3.11 \times 10^{-4}$ m². to pass the mass flow at sonic speed of 313 m/s through the throat area A* to produce the designed air power of 3625 watts.

(2b) If there are flow losses (which is the usual case) then they must be calculated or estimated. For example if the flow velocity losses are estimated to be, say, 24%, then the design mass flow rate in the case above will be m-dot=[0.074−0.24×0.074]=0.056 kg/s. In this reduced mass flow case the throat area A* must be designed to be $2.35 \times 10^{-4}$ m². At this area the maximum designed air power will be 2743 watts.

(3) The Thrust $F_{thr.}$ produced in the rotor at the nozzle exit by the throat exit flow of 313 m/s speed will be $$F_{thr.} = m\text{-dot} \times V_{exit} = m\text{-dot} \times 313 \text{ Newtons}$$

For example, a flow of 0.074 kg/s will produce a sonic nozzle thrust of $F_{thr.} = 0.074 \times 313 = 23.16$ Newtons, whereas a flow rate of 0.056 kg/s will produce a thrust of 17.53 Newtons.

(4) The Torque $T_o$ that will be produced in the rotor by the thrust $F_{thrust}$ of a nozzle flow exiting at a radial offset distance of r meters from the centre of the rotor, will then be $$T_o = F_{thrust} \times r \text{ (Newton.meters)}$$

For example, a thrust of 17.53 Newtons, exiting tangentially from the rotor nozzles at a nozzle exit radius of 0.04 meters from the rotor centre, will produce a torque of $T_o = 17.53 \times 0.04 = 0.72$ N.m.

(5) This torque $T_o$ will then produce a rotor power $P_{rotor}$ given by $P_{rotor} = T_o \times \omega$ where ω is the rotation speed in radians per second. (ω in radians/sec=(ω/2π)×60 in rpm). For example, at a rotation speed of ω=1000 radians per second (9549 rpm) and a torque of 0.72 Newtons we will have $P_{rotor} = 0.72 \times 1000 = 720$ watts. The rotor power will go up as the rotation rate ω is increased to some maximum value and then diminish to zero, To determine this maximum rotor power we need to take into account the fact that there is a reduction in thrust and torque that occurs as the rotor speeds up. In the case of air power $P_{air}$ we need only use the gas exit velocity from the nozzle relative to the nozzle. However, in the case of the rotor power, the appropriate velocity is the net velocity difference between the gas exit velocity from the nozzles and the rotor turning speed. This is because as the rotor speeds up it gradually overtakes the exiting gas flow and at some ultimate rotation speed it reduces the power to zero since there is then no net thrust. The rotor power formulae are as follows:

$$P_{rotor} = T_o \times \omega = (\text{Torque}) \times (\text{rotation})$$

$$P_{rotor} = (V_{net} \times m\text{-dot} \times r) \times \omega$$

$$P_{rotor} = [V_{exit} - V_{rotor} \times m\text{-dot} \times r \times \omega$$

Furthermore, since $\{V_{exit} - V_{rotor}\} = V_{net} = r\ \omega$, then when $V_{rotor} = V_{exit}/2 = 313/2 = r\ \omega$, we have the important result $P_{rotor} = [V_{exit}/2 \times V_{exit}/2] \text{m-dot} = \frac{1}{4} \text{m-dot } V_{exit}^2 = \frac{1}{2} P_{air}$ that is to say, at a rotor speed of one-half the sonic speed [313/2=156.5. m/s], the rotor power is one-half the maximum or sonic air power.

This can clearly be seen if we look at the rotor power curve data in Table 1. for one particular design example:

Design Specifications
Mass flow m-dot=0.074 kg/s
GInput vacuum power needed to supply 0.074 kg/s flow=1690 watts
Nozzle exit radial offset distance r=0.04 m
Nozzle exit flow speed=$V_{exit}$=sonic=313 m/s
Rotor speed at radius r=$V_{rotor}$=r ω
Rotor rotation ω=$V_{rotor}$/r
Maximum air power at sonic throat flow: $P_{air.max}$=½0.074 $V_{exit}^2$=½×0.074×$313^2$=3624 watts

TABLE 1

Rotor Power Data

| $V_{exit}$ m/s | $V_{rotor}$ m/s | [$V_{exit} - V_{rotor}$] m/s | ω rad/s | Torque $T_o$ N.m | $P_{rotor}$ = [$V_{exit} - V_{rotor}$] × 0.074 × r × ω watts |
|---|---|---|---|---|---|
| 313 | 0 | 0 | 0 | 0.074 | 0 |
| 313 | 100 | 213 | 2500 | 0.63 | 1576 |
| 313 | 120 | 193 | 3000 | 0.57 | 1714 |
| 313 | 150 | 163 | 3750 | 0.48 | 1809 |
| 313 | 156.5 | 156.5 | 3912.5 | 0.463 | 1812.4 watts (peak rotor power point) |
| 313 | 160 | 153 | 4000 | 0.45 | 1811 |
| 313 | 170 | 143 | 4250 | 0.42 | 1798 |
| 313 | 313 | 0 | 7825 | 0 | 0 |

Notes:
(a) At maximum rotor velocity (313 m/s and ω = 7825 radians/s) the rotor power is zero because the net flow absolute velocity measured relative to the test bed, developed thrust and torque have all fallen to zero.
(b) The maximum power (1812.4 watts) occurs at some lower rotor speed; that is to say at $V_{rotor}$ = 156.5 m/s and ω = 3912.5 rad./s. i.e. at a rotor velocity half the nozzle exit velocity of 313 m/s.. The maximum rotor power 1812.4 watts is thus seen to be one-half the rated sonic air power (i.e. one half of 3624 watts air power).
(c) In the case of the vacuum source specification of the cited test, the maximum rotor power (assuming 100% efficiency) also exceeds the vacuum source input power of 1690 watts by 122.4 watts - clearly a Perpetual Motion possibility. However, since the invention is an isentropic system and does not involve heat injection or rejection, it accomplishes this without at the same time infringing the second law of thermodynamics [5].
(d) In the laboratory test case cited here, the level of net power output is small (122.4 watts) but the invention can be readily scaled -up by those skilled in the art to the level of much higher net power output.
(e) Even when operated at less than maximum rotor power, the present invention can produce power at far higher efficiency than any previous air motor system. If practiced on a moving platform or in the atmospheric wind flow to provide the basic air flow, the economics obviously become even more attractive since there is much lower cost in providing the base flow of air than with a vacuum pump or compressor motor.

(6) The rotor power can also be expressed in terms of the moment of inertia I of the rotor and the angular acceleration of the rotor ∂ω/∂t. First we have $P_{rotor} = T_o \times \omega$ and since $T_o = I \times \partial\omega/dt$, then also $P_{rotor} = = I \times \partial\omega/dt \times \omega$ (7) The design Moment of Inertia I is calculable from the mass of the rotor, plus its shape and dimensions from standard formulae of rotational mechanics [1, 2, 3, 6]. With the moment of inertia, we can then go on to calculate the design angular acceleration ∂ω/∂t from the torque $T_o$ and the moment of inertia I as follows $I \times \partial\omega/\partial t = T_o$, so $\partial\omega/\partial t = T_o/I$ (8) Finally, once the design values are calculated, and the rotor assembled, the system can be operationally tested. First, the mass flow can be measured at the exit port and compared with the design value. Second, the power produced can be verified by measuring the angular acceleration ∂ω/∂t at various values of rotation ω, and comparing the observed results with the design values through the equation $P_{rotor} = = I \times \partial\omega/dt \times \omega$. Similarly the maximum rotor power produced can be observed by running the rotor at its peak power rotation speed. (In this final test the safety concerns for high rotation speeds must be kept in mind).

If the measured mass flow in the test matches the design mass flow, then clearly any losses are not greater than the design value chosen and the design will then produce the expected sonic throat flow speed and the design air power to be delivered to the rotor. If, on the other hand, the measured mass flow in the test is less than the design mass flow, the power will decline markedly. This is so because the air power equation is $P = \frac{1}{2}$m-dot×$V^2$, so that the deficiency in mass flow lowers the power linearly, but the accompanying lower flow velocity at the throat also comes into the power equation as an additional quadratic loss. We can then either attempt to reduce the large losses and so raise the mass flow to its design value, or we can redesign the rotor nozzles to accommodate the reduced flow at sonic speed and accept a lower power output.

The basic mass flow, m-dot=ρVA, which sets the scale of the whole design and the power output, can be furnished by either an air flow "push" or by a "pull", that is to say, either by a compressive air flow source or by a vacuum air flow source. It can also be set up by a natural "push" flow source such as the wind. Each case will require a different configuration of the elements of the invention such as the rotor orientation, but the claimed method will be the same in all. In the vacuum or "pull' case, the rotor will typically be orientated with its axis of rotation parallel to the general air flow through the vacuum source, that is to say the rotor itself will rotate in a plane of rotation at right angles to this said general flow. In the compressive air flow source case, the rotor axis of rotation may conveniently be at right angles to the general flow from the pressurized flow source, but various other orientation options are also possible. If the source of the mass flow of air is either the wind or the relative air flow past a moving vehicle, then the general category will be the compressive or "push" type source flow.

When the rotor, rotating with rotational kinetic energy ($I\omega^2$) of the accelerated flow is then coupled to a power transfer system it completely eliminates the need for inserting any supplementary turbine means, propeller means, or the like, to extract the flow power to do useful work. The rotor means is directly able to produce the desired rotational power and to couple it to any exterior motor, generator, or other mechanical machine desired to accomplish useful work. The method of the present invention is thus one of truly remarkable simplicity, efficiency and economy.

If the rotor nozzles are to produce the designed maximum thrust and torque, their exit flow velocity immediately downstream from their exit throat must be as near as possible to the desired sonic speed of 313 m/s. and the flow direction must also be a linear as possible. This requires that any inefficient premature deceleration and back pressure rise must be avoided as the air from the rotor passes through a diverging cone or diffuser cone linking the properly decelerating flow from the rotor to the vacuum suction source which sustains the basic mass flow rate.

There are, of course, various possible alternatives or options to the embodiment which has been described above in detail. For example, the inner air chamber plug 6 (FIG. 1) can be of various shapes or configurations all of which will alter the configuration of the exit channels 7 in FIG. 1. Also, while the rotor 2 must always be free to rotate, the inner chamber plug 6 and the diffuser 8 may be either fixed or may be attached to the rotor and rotating with it. In practice it is found better to confine the rotation to the rotor alone and make all the other elements non-rotating. The air gap where the rotor and non-rotating elements meet must obviously be kept as small and uniform as possible in order to minimize any flow losses at that point.

It is pointed out that it is also possible, with suitable design, to accelerate the nozzle exit flow from sonic to supersonic speeds and thereby produce additional thrust and rotor power.

As to the economic advantages of the invention, they are largely self evident: a huge new source of clean energy—the atmosphere itself—at a time when clean, economical and environmentally "friendly" energy is universally seen as needed for the well being of the world. The invention is also very flexible in its forms and applications. It is also suitable to be used in tandem with most existing or current types of prime movers, rather than as simply competing with them.

(f) Design Safety Considerations

With sonic nozzle flow speeds, the rotor typically revolves at very high speeds (e.g. 20,000 to 40,000 rpm or higher) It therefore develops high centrifugal stresses at its rim which can cause bursting and disintegration of the entire rotor if critical rotation speeds are reached or exceeded.

One working formula for this bursting limit in a solid rotor is [6]

$$V_{burst} = [10 \times s]^{1/2}$$

This formula gives the rim speed burst limit in feet per second for a material having tensile strength s (in lbs. per square inch). For example, any solid cylindrical rotor made of aluminum with a tensile strength of 36000 lbs./in$^2$ of any radius will have the same limiting rim speed from the formula of 600 ft per second. Perforated rotors with the nozzles cast or machined into them would have a lower burst speed and therefore a lower safe operating speed. Such safety concerns require state of the art knowledge and input from mechanical safety experts.

The present invention uses an isentropic system to enhance the kinetic energy of a flow of air by acceleration, but extracts only action/reaction energy leaving the air flow itself thermodynamically intact to then be decelerated efficiently in the diffuser and returned to its original thermodynamic state. The system of the invention operates in the isentropic domain; and, of course, while in the physical world isentropic changes are infrequent, they do occur systematically in all living organisms.

It is also noted that the present invention involves the transfer of thrust and torque of the accelerated air flow out of the nozzles to the rotor by a reaction force. This reaction force is accurately described by Newton's Law of Action and Reaction [7] and, alternatively, by the Law of Momentum Conservation. However, the ultimate physical basis for the emergence of this reaction force is still not clearly known. While the present scientific vagueness as to the ultimate origin and nature of the reaction thrust force, and so of the ultimate source of the rotary energy, remains, this does not affect the validity or working of the present invention.

I claim:

1. A method of efficiently generating and extracting power from a flow of a compressible fluid for doing useful work, comprising:
    a) inducing and sustaining a chosen mass flow of said compressible fluid by a vacuum source,
    (b) conducting said chosen mass flow of said compressible fluid from said vacuum source into and through a set of two or more conical nozzles formed within a rotor, said rotor being cylindrical and mounted on a central shaft, or axle, each said nozzle in said rotor having an equal minimum or throat cross-sectional area, and where, moreover, said throat cross-sectional area in each said nozzle is also that area which will pass an equal portion of said chosen mass flow of said compressible fluid at sonic speed,
    (c) arranging said set of conical nozzles circumferentially and symmetrically in said rotor, said set of conical nozzles being situated in a same plane of rotation, said plane of rotation of said set of conical nozzles being at right angles to an axis of rotation of said rotor, each said conical nozzle having a respective larger flow entrance port situated on an outside rim of said rotor, each said conical nozzle leading through said rotor so that a respective smaller end flow exit port opens into a central, cylindrical inner fluid flow chamber of designed radius inside said rotor, each said conical nozzle being aligned in said same plane of rotation so that said exit port of said conical nozzle is tangent to said rim of said inner fluid flow chamber at said designed radius,
    (d) each said conical nozzle having a minimum cross-sectional throat area at a smaller end thereof, each said throat in each conical nozzle being of a cross-sectional area designed to pass through each said throat at sonic speed an equal partial portion of said chosen mass flow of said compressible fluid, and with a total of all said partial portions of said compressible fluid through all said conical nozzles taken together being equal to said chosen mass flow of said compressible fluid,
    (e) said chosen mass flow of said compressible fluid exiting said conical nozzles into said inner fluid flow chamber at sonic speed and thus exerting a thrust on said rotor as said mass flow of said compressible fluid passes out from said conical nozzles and into said inner fluid flow chamber, a direction of said thrust being offset from said axis of rotation of said rotor at said designed radius from said axis of rotation of said rotor and thus exerting a torque on said rotor, said torque causing said rotor to rotate in an opposite direction to the direction of said conical nozzle exit flow into said inner fluid flow chamber, said rotor thereby acquiring by reaction force a rotational energy from said thrust of an accelerated fluid flow in said conical nozzle,
    (f) said inner fluid flow chamber having a downstream exit port of cross-sectional area not less than a combined throat area of said conical nozzles taken together, said mass fluid flow then exiting from said inner fluid flow chamber through said downstream exit port into a flow diffuser, said flow diffuser decelerating said compressible fluid flow and leading it towards a total flow exit port.

2. The method as in claim 1 wherein said compressible fluid is atmospheric air and said chosen mass flow of fluid is a mass flow of air.

3. An apparatus for efficiently generating and extracting power from a chosen mass flow of air, comprising: a rotor, a flow diffuser, and a vacuum pump,
    said rotor being cylindrical and being mounted on a longitudinal central shaft or axle at said rotor's longitudinal axis of rotation, said rotor having a set of two or more inflow conical nozzles molded, cast, machined or otherwise formed into said rotor, each said conical nozzle having a minimum cross-sectional throat area designed to pass through each said throat area of each said conical nozzle an equal portion of said chosen mass flow of air at sonic speed, said conical nozzles being circumferentially and symmetrically situated in said rotor, said set of conical nozzles being situated in a same plane of rotation in said rotor, said plane of rotation of said set of conical nozzles being at right angles to an axis of rotation of said rotor, each said conical nozzle having a respective larger flow entrance port situated on an outside rim of said rotor, each said conical nozzle leading through said rotor so that a respective smaller end's exit port of each said conical nozzle opens into a central, cylindrical inner air flow chamber of designed radius inside said rotor, each said conical nozzle being aligned in said same plane of rotation so as to be essentially tangent at said exit port to said inner air flow chamber at said designed radial distance from said longitudinal axis of rotation of said rotor, said mass flow of air exerting a large thrust force on said rotor when said mass flow of air accelerates within said set of conical nozzles to sonic speed and then enters said inner air flow chamber in said rotor, said thrust force also exerting a torque on said rotor as said mass flow of air enters said inner air chamber tangentially and at said designed radial distance from said longitudinal axis of rotation of said rotor, said rotor thus acquiring rotational power from said thrust force and said torque of said mass flow of air, said rotational power then being exportable to the exterior for useful work by coupling said rotor to a rotary power take-off, said inner air flow chamber having an axial circular exit flow port of approximately a same area as a sum total area of each respective inner exit opening leading into said inner air flow chamber of said rotor, said exit flow port in rotating said inner air flow chamber being mated and aligned to a non-rotating, tubular flow diffuser connected to a vacuum pump, said vacuum pump inducing and sustaining said chosen mass flow of air through said apparatus, said flow diffuser comprising a non-rotating cylindrical flow tube aligned to receive the high speed said mass flow of air exiting from said rotor's central inner air flow chamber and to then decelerate said mass flow of air efficiently to match said vacuum pump's intake flow speed, a length of said diffuser tube being designed to efficiently bring about said deceleration of said mass flow of air, said tubular flow diffuser having a tube diameter matching a diameter of said exit flow port of said inner air flow chamber, said tubular flow diffuser being aligned so as to receive and conduct the decelerating said mass flow from said exit flow port of said inner air flow air chamber towards and into said vacuum pump to which said tubular flow diffuser is connected, said vacuum pump having a flow capability to enable it to draw said chosen mass flow of air into and through said apparatus and then to discharge it back into the ambient atmosphere through an exit port of said vacuum pump, an air gap between the rotating said exit flow port of said inner air flow chamber and the non-rotating tube of said tubular air diffuser is kept to a designed minimum practical size in order to minimize leakage of ambient atmospheric air through said air gap into said mass air flow of said apparatus.

4. The apparatus as in claim 3, wherein a flow tube of said tubular flow diffuser is fitted with a grooved and tapered exit plug to assist in efficient deceleration of the high speed air flow exiting from said inner air flow chamber of said rotor, said exit plug having a grooved upstream flow portion and a conical tapered downstream flow portion, said exit plug being mounted in said flow diffuser's said flow tube by two or more mounting and centering pins holding said exit plug securely attached to said tubular flow diffuser so that said upstream grooved portion of said exit plug extends beyond the flow tube, and said tapered downstream flows portion of said exit plug is within said flow tube, said flow diffuser tube being aligned to, and mated closely to, said exit port of said inner air flow chamber so that said upstream grooved portion of said exit plug extends beyond the upstream end of said diffuser and into said inner air flow chamber but without making any physical contact between said grooved portion of said exit plug and rotating said inner air flow chamber and thus leaving a small air gap between non-rotating said diffuser's upstream end with its said exit plug and said inner air flow chamber which is rotating in said rotor.

\* \* \* \* \*